United States Patent
Medberry

(10) Patent No.: US 6,827,335 B1
(45) Date of Patent: Dec. 7, 2004

(54) CENTER MOTOR DRIVEN STABILIZER JACK

(76) Inventor: Joseph M. Medberry, 35 Luther St., Seekonk, MA (US) 02771

( * ) Notice: Subject to any disclaimer, the term of this patent is extended or adjusted under 35 U.S.C. 154(b) by 0 days.

(21) Appl. No.: 10/652,418

(22) Filed: Aug. 29, 2003

(51) Int. Cl.$^7$ ................................................. B60S 9/02
(52) U.S. Cl. ..................... 254/425; 254/424; 280/764.1; 280/765.1
(58) Field of Search ................................ 254/425, 424, 254/420, 418, 419; 280/763.1, 766.1, 764.1, 765.1

(56) References Cited

U.S. PATENT DOCUMENTS

| | | | | |
|---|---|---|---|---|
| 3,870,276 A | * | 3/1975 | Phillips | ........................ 254/425 |
| 4,103,869 A | * | 8/1978 | Mesny et al. | ................ 254/425 |
| 5,205,586 A | * | 4/1993 | Tallman | .................... 280/764.1 |
| 5,826,889 A | | 10/1998 | Eden | |
| 5,901,980 A | * | 5/1999 | Few et al. | ................ 280/763.1 |
| 6,224,102 B1 | * | 5/2001 | Nebel | ....................... 280/765.1 |
| 6,494,487 B1 | * | 12/2002 | Nebel | ....................... 280/765.1 |

* cited by examiner

Primary Examiner—Lee D. Wilson
(74) Attorney, Agent, or Firm—John P. McGonagle

(57) ABSTRACT

A center motor driven stabilizer jack having a motor driven slip differential which drives a left and a right thread screw lowering attached stabilizer legs which adjust and compensate for uneven terrain at the same time. The stabilizer jack slip differential, motor and the thread screws are mounted horizontally providing a low profile. The center drive system creates a beam style support the stabilizer legs to be moved further out for greater stability.

12 Claims, 6 Drawing Sheets

CENTER MOTOR DRIVEN STABILIZER JACK

BACKGROUND OF THE INVENTION

This invention relates to stabilizer jacks, and in particular, to motorized stabilizer jacks for recreational vehicles adapted to raise a recreational vehicle relative to its suspension to provide stability to the vehicle when parked.

It is desirable to stabilize recreational vehicles once the vehicle is parked for use. A wide variety of recreational vehicle stabilizing jacks have been developed for use in stabilizing recreational vehicles, trailers, and the like, when parked. Prior art jacks raise the vehicle relative to its suspension system thereby preventing rocking and swaying of the recreational vehicle as an occupant moves around in the vehicle. Early stabilizing jacks provided on recreational vehicles were manually operated, requiring the owner to walk around the vehicle and manually operate four jacks to stabilize the vehicle at a campsite. This operation may be difficult and cumbersome, especially at night or in adverse weather conditions.

Later prior art stabilizer jacks were motorized, but still had problems. The motors used were often prone to damage during transport of the recreational vehicle because of clearance problems. Other motorized jacks operated each leg independently making it difficult to properly stabilize the vehicle. U.S. Pat. No. 6,224,102 to Nebel discloses a motorized stabilizer jack utilizing a single drive screw with left and right hand threads with a drive unit mounted to the end of the screw drive. During terrain compensation of this device, the drive screw is forced to move left to right on the body of the recreational vehicle. Mounting the motor on the end of the drive screw creates one of two problems. In the first condition, if the motor is mounted inside the body of the recreational vehicle, the amount of screw available for use is limited, causing the stabilizer legs to be closer together under the vehicle. In a second alternative condition, the motor is mounted outside of the body of the recreational vehicle. When maneuvering in tight areas such as camp grounds, the motor can be damaged, as well as the vehicle itself, because of trees and rocks. U.S. Pat. No. 5,826,889 to Eden utilized a vertical screw drive that is rotated in position at the time of use. The space required to operate such a system is not always available under the recreational vehicle thereby limiting its functionality.

SUMMARY OF THE INVENTION

In view of the foregoing disadvantages inherent in the known types of devices now present in the prior art, the present invention has as its main objective to provide a motorized stabilizer jack that has a low profile and fits under a recreational vehicle in a small area without protruding parts. A further objective is to provide a motorized stabilizer jack able to position the stabilizer to the furthest outside edge of the recreational vehicle body thereby providing enhanced stability.

To attain this, the present invention provides a motor driven slip differential which drives a left and a right thread screw lowering stabilizer legs which adjust and compensate for uneven terrain at the same time. The present invention slip differential system has torque balancing properties across two shafts. This allows complete terrain compensation through the entire stroke of the two stabilizers without the need for a balancing electric circuit. The present invention shafts and the drive screw are mounted horizontally making the present invention the only known low profile motor driven under chassis assembly. The present invention's center drive system creates a beam style support allowing the stabilizer legs to be moved further out for greater stability.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be made to the accompanying drawings and descriptive matter in which there is illustrated a preferred embodiment of the invention.

DETAILED DESCRIPTION OF THE INVENTION

Figure 1:
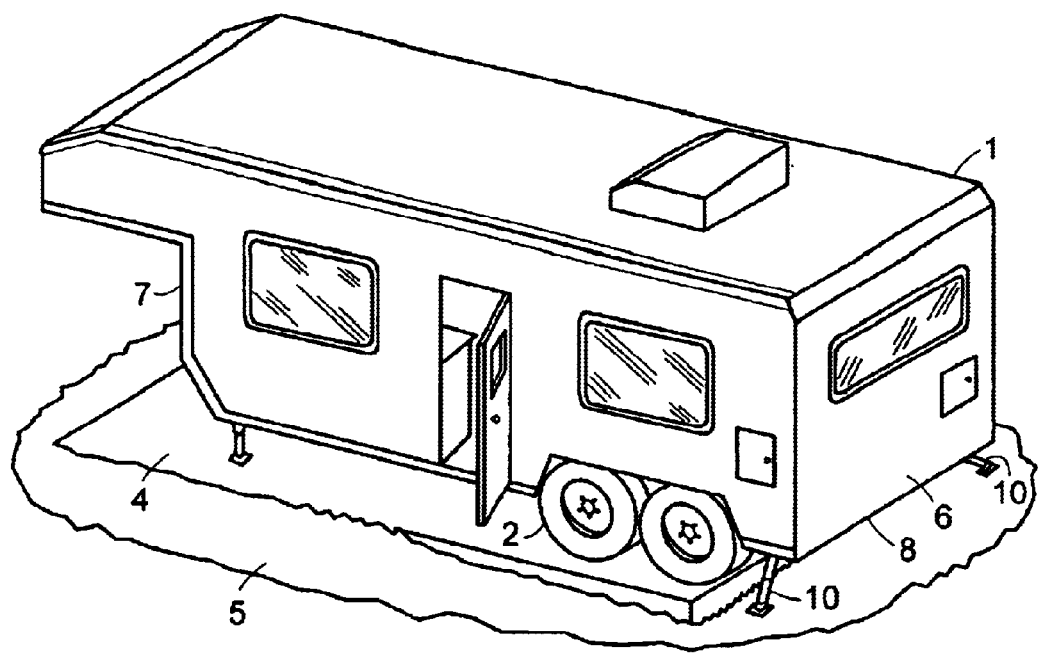
FIG. 1 is a perspective view of a recreational vehicle having a deployed stabilizing jack secured beneath the rear chassis.

Referring to the drawings in detail wherein like elements are indicated by like numerals, there is shown a recreational vehicle 1 with a stabilizer jack assembly 10 attached to a frame member 3. The recreational vehicle 1 is shown parked on a pad 4 and overhanging the ground 5 around the pad 4. The recreational vehicle 1 is supported on a spring suspension system (not shown) connected to wheels 2. The suspension system is adapted to provide a smooth ride during travel. However, when the recreational vehicle 1 is parked, the suspension system allows the vehicle 1 to rock back and forth and bounce up and down relative to the wheels 2 as an occupant moves around the vehicle 1.

The purpose of the stabilizer jack assembly 10 is to raise the vehicle 1 upward relative to the wheels 2 to take some of the weight of the vehicle 1 off of the suspension system to stabilize the vehicle 1 and prevent rocking and bouncing of the parked vehicle 1. In the embodiment and recreation vehicle shown, one stabilizer jack assembly 10 is mounted across and under the rear end 6 the vehicle 1, rearward of the wheels 2, by attachment to a frame member 3 protruding downward from the vehicle body bottom 8. In other types of recreational vehicles a second stabilizer jack assembly could be mounted across and under the front 7 of the vehicle. Although the pad 4 will be generally level, bare ground or ground 7 around a pad may not be level.

The stabilizer jack assembly 10 of the present invention is comprised of a motor drive slip differential assembly 11, driving an elongated left 20 and an elongated right 21 thread screw lowering and raising attached stabilizer legs 30. The stabilizer jack assembly 10 is further comprised of a guide rail 40 encompassing each thread screw 20, 21. Each guide rail 40 is attached to a vehicle frame member 3 and supports the load from the vehicle 1.

Figure 2:
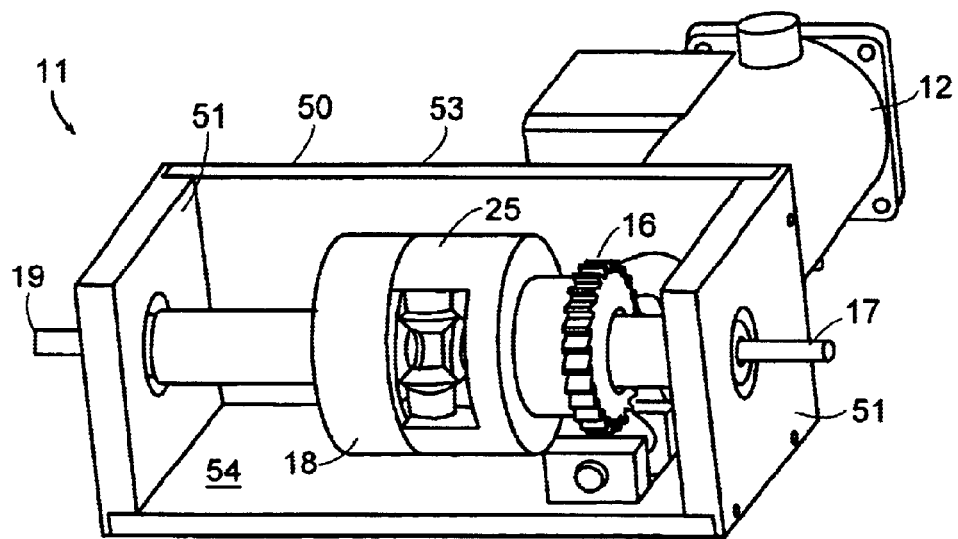
FIG. 2 is a perspective front view of the motor driven differential.
Figure 3:
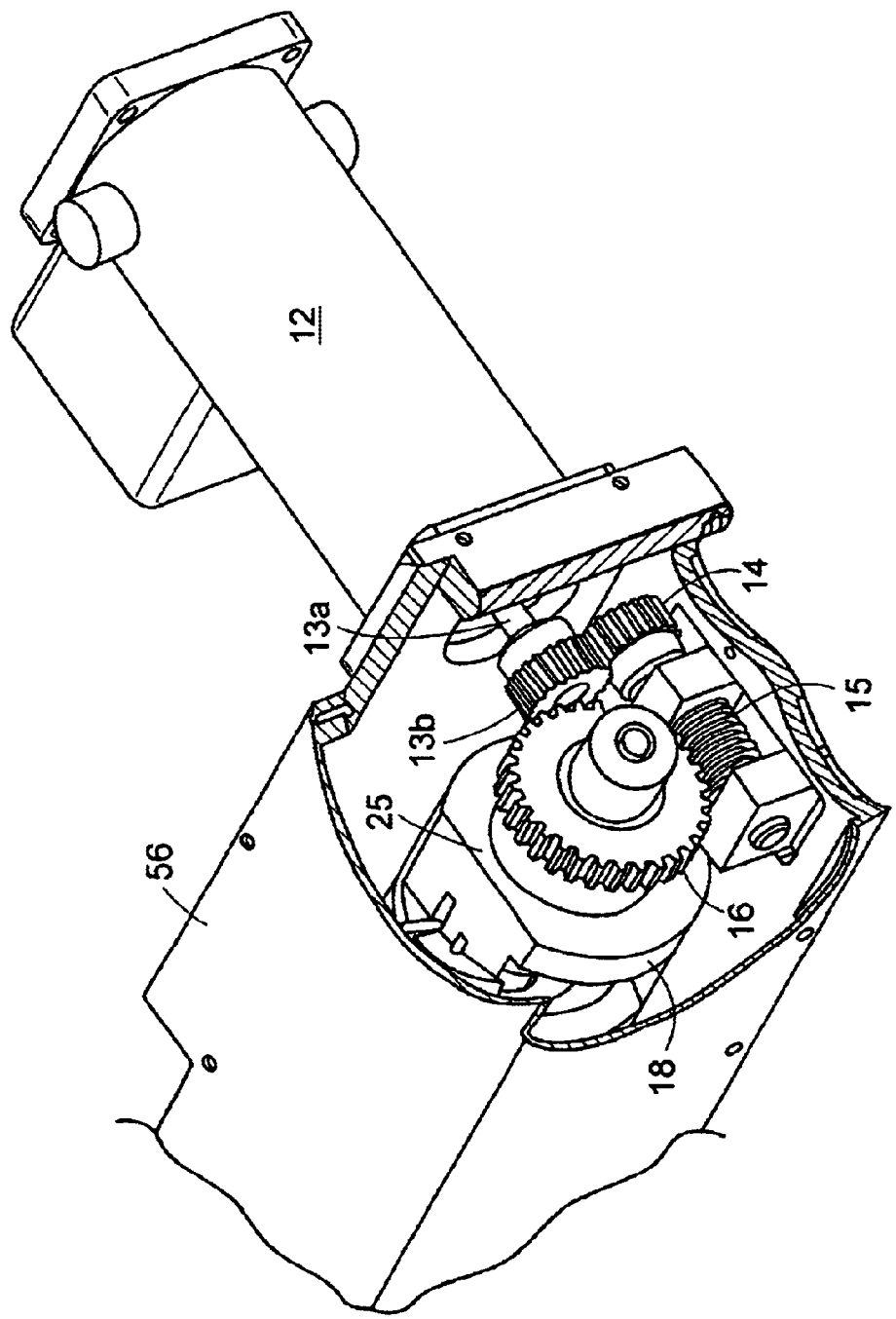
FIG. 3 is a side perspective view of the motor driven differential.
Figure 4:
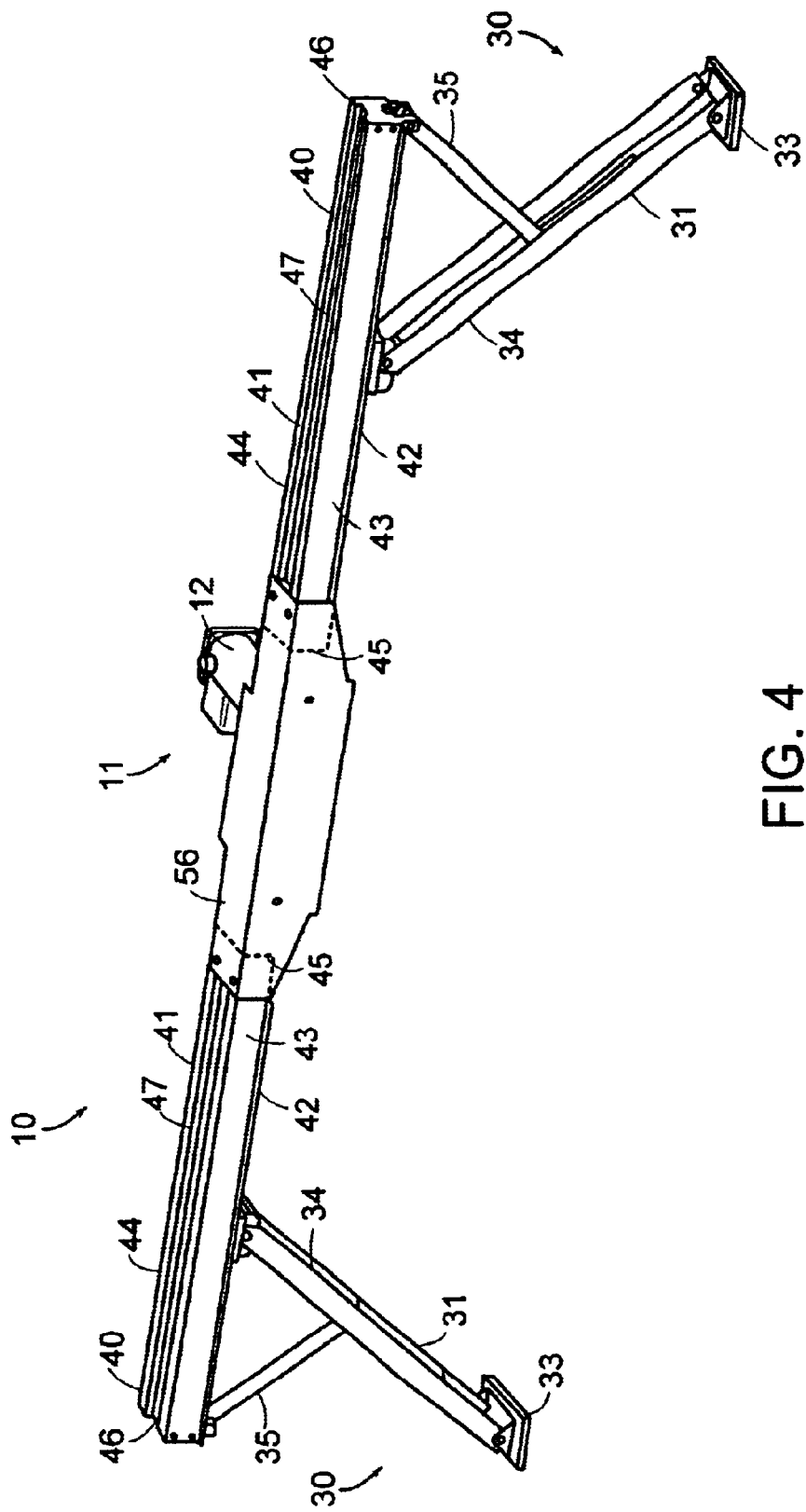
FIG. 4 is a front perspective view of the invention
Figure 5:
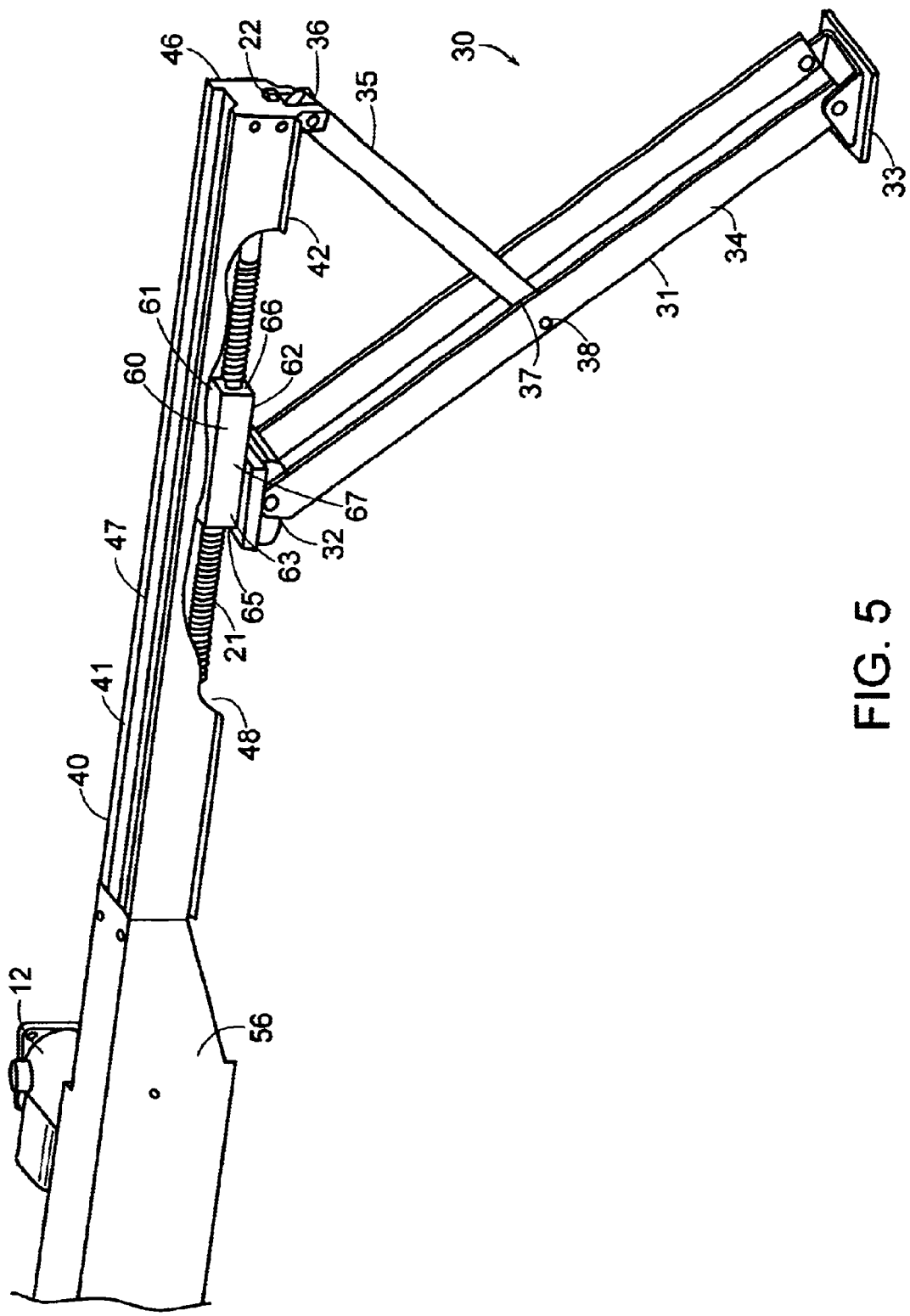
FIG. 5 is a is a front perspective view, partly in section, of one stabilizer leg.
Figure 6:
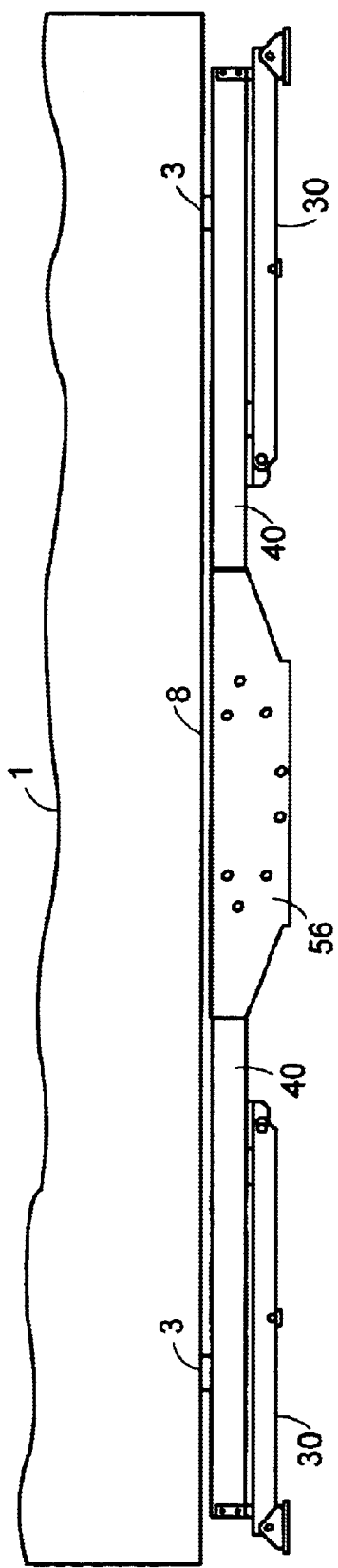
FIG. 6 is a front view of the invention in a closed position.
Figure 7:
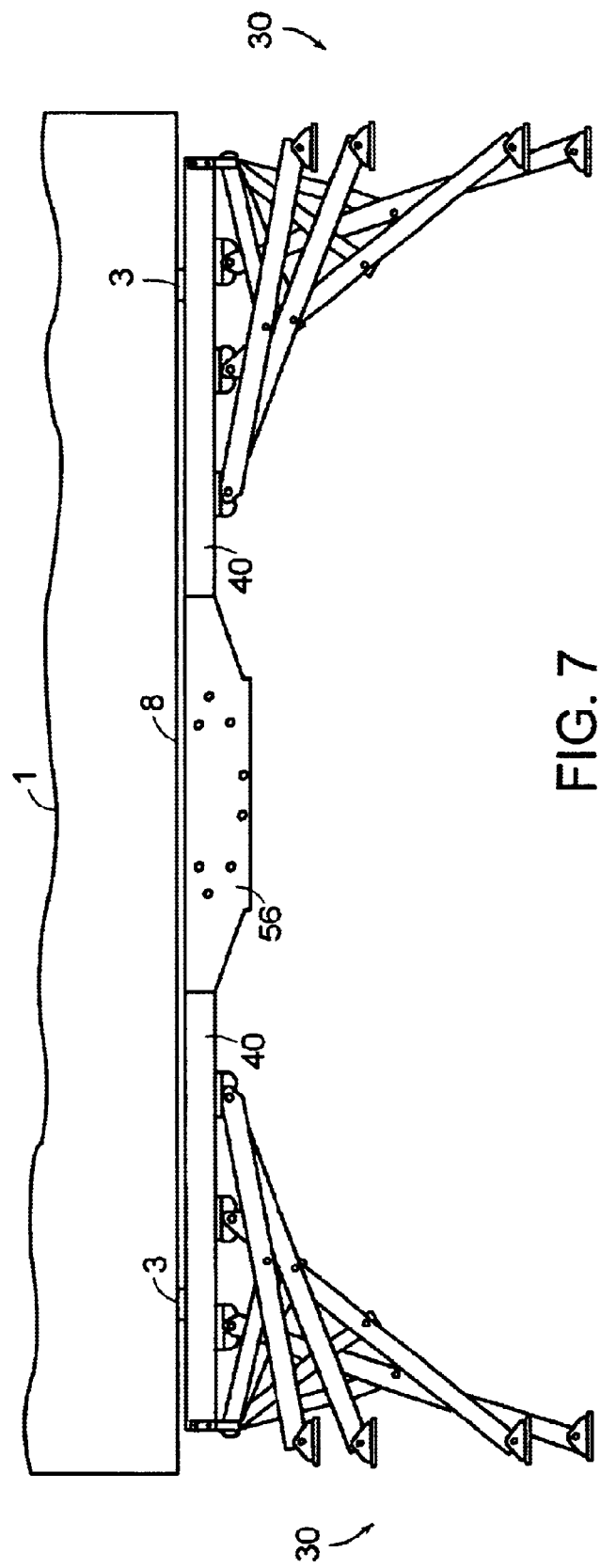
FIG. 7 is a front view of the invention showing deployable positions of the stabilizer legs.

The differential assembly 11 which can most clearly be understood by viewing FIGS. 2 and 3, is comprised of a motor 12 with a drive shaft 13a driving a first gear 13b. The first gear 13b engages a second gear 14 directly attached to a worm gear 15. The worm gear 15 engages a toothed wheel 16. The toothed wheel 16 is directly attached to a slip differential casing 25. A first output shaft 17 and a second output shaft 19 are attached to miter gears (not shown) within a slip differential 18. The shafts 17, 19, slip differential 18, and motor 12 lay generally in a horizontal plane generally parallel to the vehicle body bottom 8. The motor 12 torque is translated to the output shafts 17, 19 via the gears 13b, 14, 15, toothed wheel 16 and slip differential 18. The slip differential 18 enables one output shaft to continue turning regardless of resistant encountered by the other shaft. The gears 13b, 14, 15, toothed wheel 16, differential 18 and output shafts 17, 19 are housed in a generally rectangular box 50, with the output shafts 17, 19 protruding out of the box interior 54 through opposite box sides 51. The motor 12 is attached to another box side 53 external to the box 50. The motor drive shaft 13a protrudes from the motor 12 into the box interior 54.

Each thread screw 20, 21 is housed within a guide rail 40. Each guide rail 40 has a generally rectangular cross section, a top 41, an open bottom 42, a front 43, a rear 44, a proximal end 45 and a distal end 46, said proximal end 45 and distal end 46 defining a guide rail longitudinal axis. The guide rail top 41, bottom 42, front 43, rear 44, proximal end 45 and distal end 46 define a guide rail interior 48. The guide rail top 41 may have a longitudinal groove or channel 47 formed therein to strengthen the guide rail 40. The guide rail proximal end 45 abuts a box shaft side 52 and accepts one of the output shafts through its proximal end 45 into its interior 48. A bracket 56 is attached over the box 50 and proximal ends 45 of the guide rails 40. The guide rail tops 41 are attached to vehicle frame members 3.

The screws 20, 21 lay entirely within the interior 48 of their respective guide rail 40. The left thread screw 20 is directly coupled to the second output shaft 19. The right thread screw 21 is directly coupled to the first output shaft 17. Each screw has an end 22 opposite to the one coupled to an output shaft 17, 19. Each screw opposite end 22 is rotationally joined to a guide rail distal end 46.

A generally rectangular positioning block 60 is threadingly engaged to each screw 20, 21 within the guide rail interior 48. Each positioning block 60 has a top 61, a bottom 62, a front 63, a rear 64, a proximal end 65 and a distal end 66, said proximal end 65 and distal end 66 defining a positioning block longitudinal axis, said positioning block longitudinal axis being coincident with the guide rail longitudinal axis. The positioning block 60 has an interior, threaded aperture 67 from the proximal end 65 to the distal end 66. Each screw 20, 21 threadingly engages the interior aperture 67 of its respective positioning block 60. The positioning block bottom 62 faces the guide rail open bottom 42.

The stabilizer jack 10 has two stabilizer legs 30, each comprised of an elongated support leg 31 and an elongated fixed linkage 35. Each support leg 31 has an attachment end 32, a support end 33, and a body 34 interconnecting said ends 32, 33. Each support leg attachment end 32 is pivotally connected to the bottom 62 of a positioning block 60. Each support end 33 is adapted to rest on the ground 4 or 5. Each fixed linkage 35 has two ends, a rail attachment end 36 and a support attachment end 37. The fixed linkage rail attachment end 36 is pivotally joined at the guide rail bottom 42 to the guide rail distal end 46. Each fixed linkage support attachment end 37 is pivotally attached to a respective support leg 31 at a point 38 intermediate of the support leg ends 32, 33.

In operation, the motor 12 drives the slip differential assembly 11 causing the shafts 17, 19 and their respective drive screws 20, 21 to rotate. The screw rotation causes each positioning block 60 to move along its respective screw 20, 21. The movement of a positioning block 60 forces its respective attached stabilizer leg 30, in conjunction with the leg's fixed linkage 35, to react to either extend to the ground or retract toward a closed position. The differential assembly 11 will allow the ground to stop the advancement of the stabilizer leg 30 by stopping the rotation of the drive screw 20, 21. When the drive screw of one stabilizer leg stops, the differential assembly redirects the motor torque to the other stabilizer leg. The motor 12 may be operated remotely by electrical switches or other electrical controls.

It is understood that the above-described embodiment is merely illustrative of the application. Other embodiments may be readily devised by those skilled in the art which will embody the principles of the invention and fall within the spirit and scope thereof.

I claim:

1. A stabilizer jack assembly for use with a vehicle having a body, a body rear end, a body bottom, a plurality of wheels resting on a ground, and a frame member protruding downward from the vehicle body bottom, comprising:

a motor driven slip differential assembly;

an elongated left thread screw driven by said motor driven slip differential assembly;

an elongated right thread screw driven by said motor driven slip differential assembly;

a stabilizer leg attached to each said thread screw, each said stabilizer leg adapted to be raised and lowered by said attached thread screw;

a guide rail encompassing each said thread screw, each said guide rail being attached to said vehicle frame member; and a bracket attached to said motor driven slip differential assembly and each said guide rail.

2. A stabilizer jack assembly as recited in claim 1, wherein the differential assembly comprised of:

the motor with a drive shaft;

a first gear attached to and driven by said drive shaft;

a second gear engaged by said first gear;

a worm gear directly attached to said second gear;

a toothed wheel engaged by said worm gear, said toothed wheel being directly attached to a slip differential housing containing a slip differential;

a first output shaft attached to said slip differential;

a second output shaft attached to said slip differential;

wherein said left thread screw is directly coupled to the second output shaft and said right thread screw is directly coupled to the first output shaft.

3. A stabilizer jack assembly as recited in claim 2, wherein:

said gears, toothed wheel, slip differential and output shafts are housed in a generally rectangular box, with the output shafts protruding out of a box interior through opposite box sides, said motor being externally attached to another box side external to the box, said motor drive shaft protruding from the motor into the box interior.

4. A stabilizer jack assembly as recited in claim 3, wherein:

said motor driven slip differential assembly, said output shafts, said box, and said thread screws lay generally in a horizontal plane generally parallel to the vehicle body bottom.

5. A stabilizer jack assembly as recited in claim 4, wherein:

each guide rail has a generally rectangular cross section, a top, an open bottom, a front, a rear, a proximal end and an opposite distal end, said proximal end and distal end defining a guide rail longitudinal axis, said guide rail top, bottom, front, rear, proximal end and distal end defining a guide rail interior, wherein said guide rail proximal end abuts a box shaft side and accepts one of the output shafts into the guide rail interior.

6. A stabilizer jack assembly as recited in claim 5, wherein:

each thread screw has two ends, one end coupled to an output shaft and another opposite end rotationally joined to a guide rail distal end.

7. A stabilizer jack assembly as recited in claim 6, further comprising:

a generally rectangular positioning block threadingly engaged to each thread screw within the guide rail interior, each said positioning block having a top, a bottom, a front, a rear, a proximal end and a distal end, said proximal end and distal end defining a positioning block longitudinal axis, said positioning block longitudinal axis being coincident with the guide rail longitudinal axis, positioning block having an interior, threaded aperture from the proximal end to the distal end, wherein each screw threadingly engages a positioning block interior aperture, said positioning block bottom facing the guide rail open bottom.

8. A stabilizer jack assembly as recited in claim 7, wherein each stabilizer leg is comprised of:

an elongated support leg having an attachment end, a support end, and a body interconnecting said ends, each support leg attachment end being pivotally connected to the bottom of a positioning block, each support leg support end adapted to rest on the ground; and an elongated fixed linkage having a rail attachment end and a support attachment end, said fixed linkage rail attachment end being pivotally joined at the guide rail bottom to the guide rail distal end, each said fixed linkage support attachment end being pivotally attached to a support leg at a point intermediate of the support leg attachment end and support end.

9. A stabilizer jack assembly as recited in claim 8, further comprising:

electrical controls attached to and remote from said motor.

10. A stabilizer jack assembly as recited in claim 9, wherein:

said bracket is attached over the box and proximal ends of the guide rails.

11. A stabilizer jack assembly as recited in claim 10, wherein:

the guide rail tops are attached to vehicle frame member.

12. A stabilizer jack assembly as recited in claim 11, wherein:

the guide rail top has a longitudinal channel formed therein.

* * * * *